W. H. KERN.
RESILIENT WHEEL.
APPLICATION FILED OCT. 24, 1911.

1,033,417.

Patented July 23, 1912.

2 SHEETS—SHEET 1.

Witnesses:
E. A. Jarvis
George H. Measures

Inventor:
William H. Kern
by Edmunds & Pick
attorneys

COLUMBIA PLANOGRAPH CO., WASHINGTON, D. C.

W. H. KERN.
RESILIENT WHEEL.
APPLICATION FILED OCT. 24, 1911.

1,033,417.

Patented July 23, 1912.
2 SHEETS—SHEET 2.

Witnesses:
C. A. Jarvis
George A. Measures.

Inventor:
William H. Kern
by Edmonds Kck
attorneys

UNITED STATES PATENT OFFICE.

WILLIAM H. KERN, OF JERSEY CITY, NEW JERSEY.

RESILIENT WHEEL.

1,033,417.   Specification of Letters Patent.   Patented July 23, 1912.

Application filed October 24, 1911. Serial No. 656,517.

*To all whom it may concern:*

Be it known that I, WILLIAM H. KERN, a citizen of the United States, and a resident of Jersey City, in the county of Hudson and State of New Jersey, have invented certain new and useful Improvements in Resilient Wheels, of which the following is a specification.

My invention relates to improvements in that class of wheels which are used for road vehicles, such as automobiles, motor trucks and carriages, and refers particularly to those resilient wheels which, when combined with hard rubber tires, practically serve the purposes of wheels having pneumatically inflated tires, and the objects of my improvements are, among other things, to provide a resilient wheel which shall be reliable in use, and to provide a durable and economical wheel that may be used in lieu of the necessarily costly and unsatisfactory pneumatic tires, without loss of the resiliency and elasticity possessed by the latter.

My improved resilient wheel also is constructed so as to be easily repaired, and the resilient means can be removed for adjustment and repair without inconvenience and expense.

I attain these objects by the mechanisms shown in the accompanying drawings in which—

Figure 1:
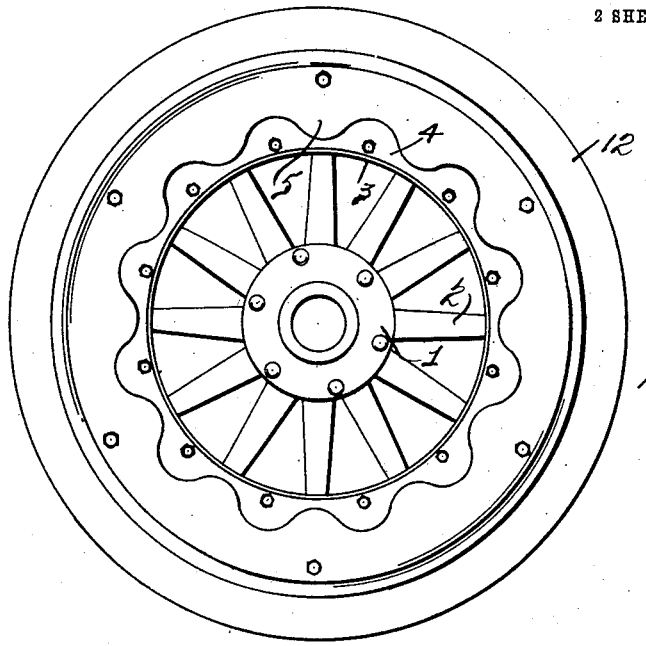
Figure 2:
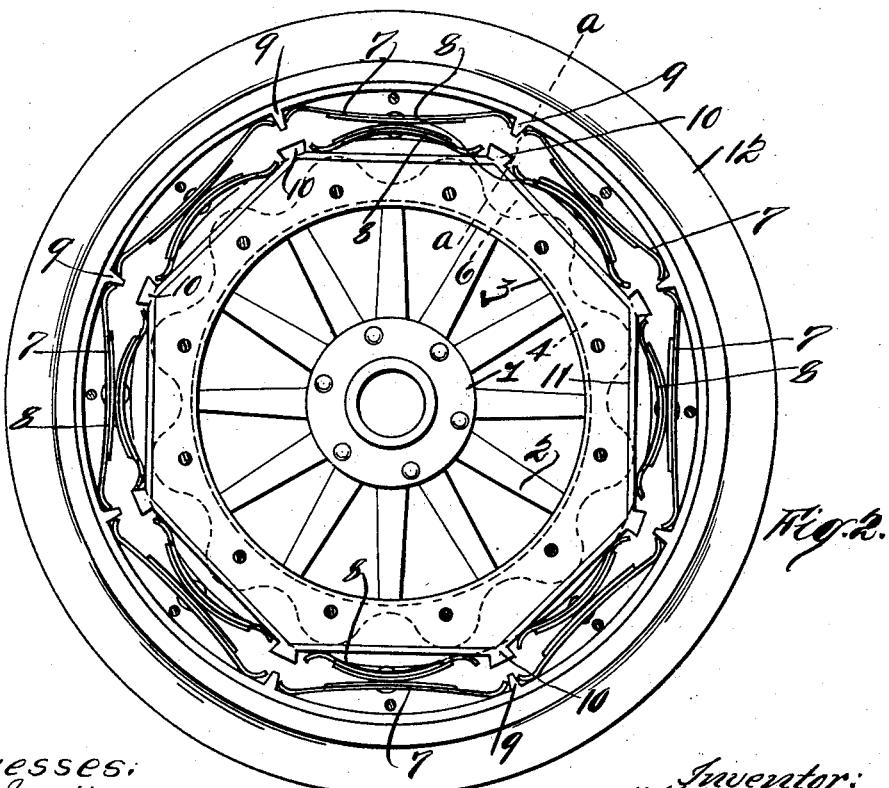
Figure 3:
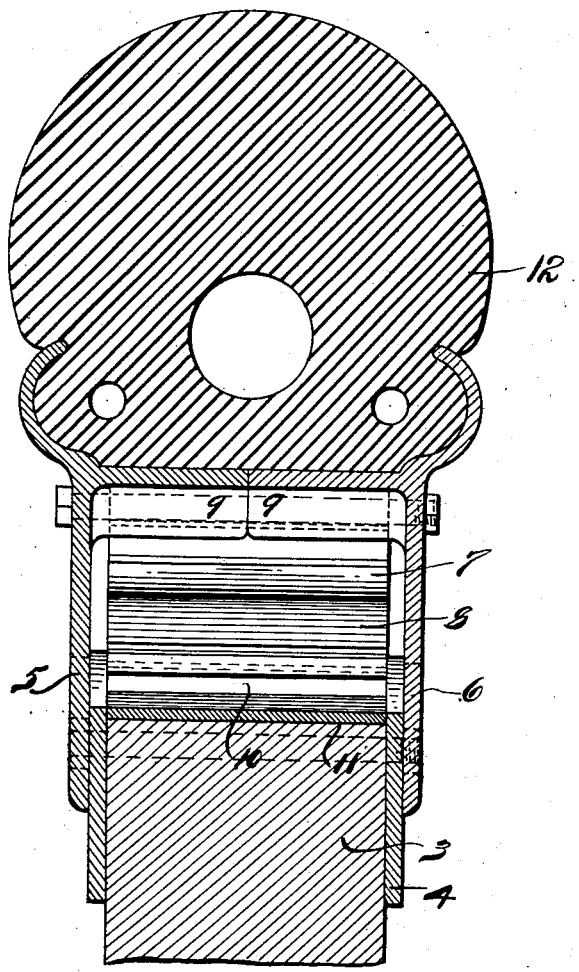

Figure 1 is a side view of my improved wheel; Fig. 2 is a slightly enlarged side view with one of the outer rings removed so as to show the interior construction and location of the various parts comprising the wheel; Fig. 3 is an enlarged cross-sectional view taken on the line *a—a* of Fig. 2, looking in the direction of the arrow.

Similar numerals refer to similar parts throughout the several views.

Referring now to the drawings, 1 represents the hub portion of the wheel of ordinary construction, having rigidly attached thereto a plurality of radially disposed spokes 2, which support on their outer ends the felly 3, which is polygonal in form, as shown in Fig. 2, and the outer flat faces of which have the bearing plates 11, preferably of metal, rigidly secured thereto. At the apices of the polygonal felly are transverse ribs 10, as shown in Fig. 2.

4 represents two metallic rings rigidly secured by bolts or other means to the opposite sides of the felly, as shown in Fig. 3.

5 and 6 are two tire supporting members, similar in form, having their outer ends curved so as to clench and hold within the recess formed by such outer end the solid rubber tire 12, as shown in Fig. 3. The two tire supporting members 5 and 6 are preferably formed as shown in the drawings, and the inner flanges of which are mutually parallel and adapted to freely move and slide over the outer surfaces of the rings 4, which are attached to the felly as hereinbefore described.

9 represents a plurality of transverse ribs upon the tire supporting members 5 and 6, oppositely disposed to the transverse ribs 10, as shown in Fig. 2.

7 and 8 represent a series of loose doubly concave elliptical springs which furnish the resilient means for my improved wheel. These springs are of the leaf type and are rigidly secured by bolts or other means at their centers as shown in Fig. 2. The outer ends of the spring 8 are adapted to move freely within the recess formed between the respective transverse ribs 10, bearing the while upon the metal plates 11, while the outer ends of the spring 7 are adapted to move along the inner circular surface of the tire supporting members 5 and 6 within the recess formed between the transverse ribs 9 which are a part of such tire supporting members 5 and 6.

Having described the various parts which go to make up my improved wheel, it will be obvious that in the practical use of this wheel the tire supporting rim with its tire is permitted to yield upon the loosely mounted springs in the annular space between such tire supporting members and the polygonal felly, so as to do away with all objectionable jars and thereby relieve the axle from jolts. The inner flanges of the tire supporting members 5 and 6 while moving over the rings 4 upon the felly fit sufficiently snugly to such rings as to prevent dust and mud or other objectionable material from entering into the annular space and so clog the action of the springs.

The operations of the springs are apparent, and in practical use these springs will yield to any unusual external pressure so as to prevent excessive jars to the occupants of the vehicle and injury by undue vibration to the working parts of a motor or other devices usually carried by vehicles of this type.

I claim as my invention—

1. In a resilient wheel, the combination of a hub with radial spokes, the outer ends of which carry a polygonal felly having outwardly disposed flat faces, an outer concentric tire-supporting member independently movable relatively to the felly, a plurality of doubly concave elliptical springs equal to the number of faces on the felly, loosely held and operating between said faces and the tire-supporting member, and having their inner and outer ends bearing against said faces of the felly and tire-supporting member respectively, and two exterior mutually parallel rings integral with the tire-supporting member, the inner flanges of which are movable over the opposite sides of the felly to inclose said springs, and the outer ends of which hold the tire to the tire-supporting member.

2. In a resilient wheel, the combination of a hub with radial spokes, the outer ends of which carry a polygonal felly having outwardly disposed flat faces, transverse ribs affixed to the apices of said polygonal felly, an outer concentric tire-supporting member independently movable relatively to the felly, and having a series of transverse ribs oppositely and radially disposed to the transverse ribs on said felly, a plurality of doubly concave elliptical springs equal to the number of faces on the felly, loosely held and operating between said faces and the tire-supporting member, and having their inner and outer ends bearing against said faces of the felly and tire-supporting member respectively, and two exterior mutually parallel rings integral with the tire-supporting member, the inner flanges of which are movable over the opposite sides of the felly to inclose said springs and the outer ends of which hold the tire to the tire-supporting member.

WILLIAM H. KERN.

Witnesses:
PHILIP C. PECK,
GEORGE G. MEASURES.

---

Copies of this patent may be obtained for five cents each, by addressing the "Commissioner of Patents. Washington, D. C."